(12) United States Patent
Kiraly et al.

(10) Patent No.: US 8,442,560 B1
(45) Date of Patent: May 14, 2013

(54) MODE SWITCHING USER DEVICE

(76) Inventors: Kenneth P. Kiraly, Menlo Park, CA (US); Subram Narasimhan, Saratoga, CA (US)

( * ) Notice: Subject to any disclaimer, the term of this patent is extended or adjusted under 35 U.S.C. 154(b) by 1178 days.

(21) Appl. No.: 12/260,884

(22) Filed: Oct. 29, 2008

Related U.S. Application Data

(60) Provisional application No. 60/989,050, filed on Nov. 19, 2007.

(51) Int. Cl.
*H04W 68/00* (2009.01)

(52) U.S. Cl.
USPC ..... 455/458; 455/515; 455/552.1; 455/553.1; 455/557

(58) Field of Classification Search .................. 455/458, 455/515, 552.1, 557
See application file for complete search history.

(56) References Cited

U.S. PATENT DOCUMENTS

| | | | | |
|---|---|---|---|---|
| 7,716,224 B2 * | 5/2010 | Reztlaff et al. | ............... | 707/741 |
| 2003/0152049 A1 * | 8/2003 | Turner | ........................... | 370/331 |
| 2003/0187954 A1 * | 10/2003 | Wen et al. | ..................... | 709/219 |
| 2005/0003836 A1 * | 1/2005 | Inoue et al. | ................... | 455/458 |
| 2007/0072583 A1 * | 3/2007 | Barbeau et al. | ............ | 455/404.2 |
| 2007/0165709 A1 * | 7/2007 | Walker et al. | ................. | 375/219 |
| 2007/0197234 A1 * | 8/2007 | Gill et al. | ...................... | 455/458 |
| 2007/0268858 A1 * | 11/2007 | Soto | .............................. | 370/328 |
| 2008/0207258 A1 * | 8/2008 | Rofougaran et al. | ....... | 455/552.1 |
| 2008/0298275 A1 * | 12/2008 | De Sousa | ...................... | 370/255 |
| 2009/0298515 A1 * | 12/2009 | Czaja et al. | ............... | 455/456.5 |

* cited by examiner

*Primary Examiner* — Olumide T Ajibade Akonai
*Assistant Examiner* — Edward Zhang
(74) *Attorney, Agent, or Firm* — Lee & Hayes, PLLC

(57) ABSTRACT

An item-providing system supplies items to a user device for consumption at the user device via communication infrastructure. In one representative implementation, a user device includes a mode switching wireless communication module. The mode switching wireless communication module is adapted to receive a first paging signal via a first communication protocol when in a first mode of operation and adapted to receive a second paging signal via a second communication protocol when in a second mode of operation. The user device also includes a to-do list processing module. In response to receiving one of the first or second paging signal, the to-do list processing module sends a request to a remote network device. The request requests that one or more instructions be sent from the remote network device.

12 Claims, 8 Drawing Sheets

In-band "todo" request server – EVDO and active 1xRTT mode (within 104)

Related system startup (within 104)

Out-of-band "todo" request processor – 1xRTT sleep mode (104)

"Process todo" event processor (within 104)

MODE SWITCHING USER DEVICE

CLAIM OF PRIORITY

This application claims priority from U.S. Provisional Patent Application No. 60/989,050, entitled "MODE SWITCHING USER DEVICE", filed on Nov. 19, 2007, which is incorporated herein by reference in its entirety.

FIELD OF THE DISCLOSURE

The present disclosure is generally related to a mode switching user device.

BACKGROUND

Users have traditionally consumed media items (such as books, magazines, newspapers, etc.) in hard-copy form. For instance, a user may obtain a physical book from a bookstore or a library. The user can read the book by manually flipping through its pages in conventional fashion.

A user may now also receive and consume some media items in electronic form. In one case, a user may use a personal computer to connect to a network-accessible source of media items via a conventional telephone or cable modem. The user may download a document from this source. The user may consume the document by printing it out and reading it in conventional fashion. Alternatively, the user may read the document in electronic form, that is, by reading the book as presented on a computer monitor.

A provider of electronic media items faces various challenges. For instance, many users continue to prefer consuming media items in traditional form, even though these media items are available in electronic form. The provider confronts the task of capturing the interest of such users, while providing a solution that is viable from a technical standpoint and a business-related standpoint.

DETAILED DESCRIPTION OF THE DRAWINGS

Figure 1:
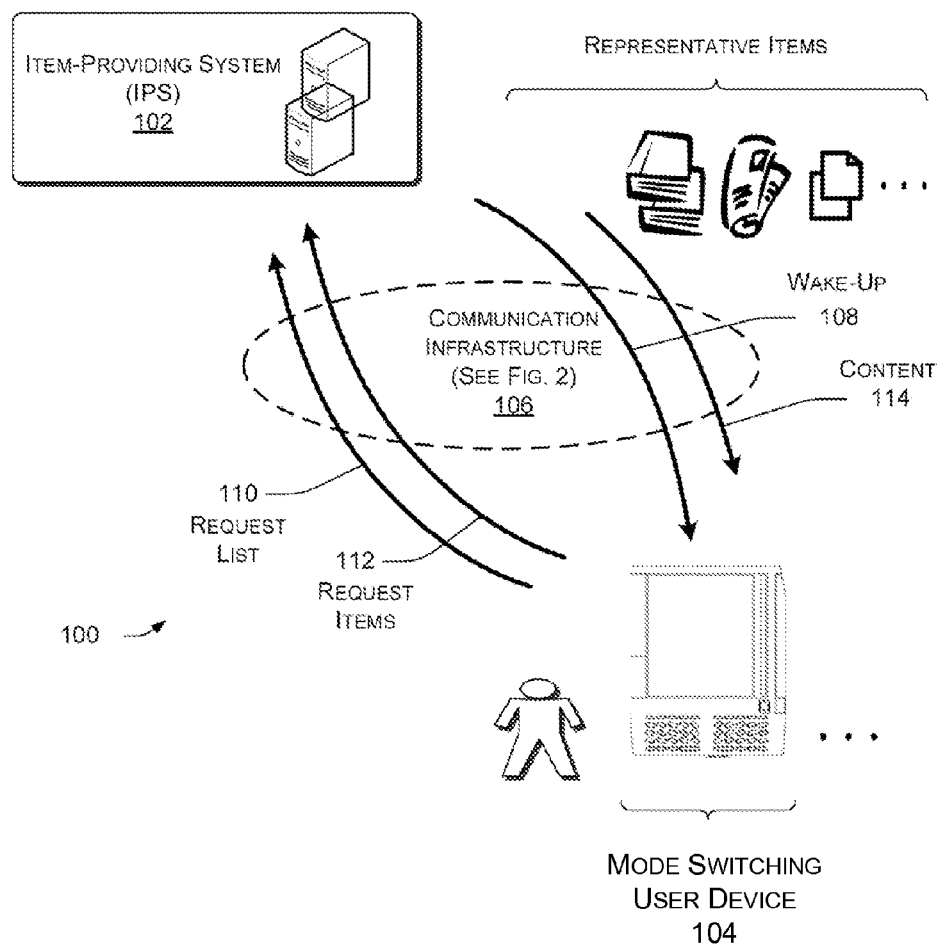
FIG. 1 shows an overview of an embodiment system for downloading items to a user device.

According to one illustrative embodiment, this disclosure sets forth functionality for downloading items to a user device. The functionality can be manifested in various systems, modules, computer readable media, data structures, methods, and other forms.

The "item" referenced above may correspond to any type of content. In one case, the item corresponds to a digital media item. The media item can include, without limitation, text content, image content, audio content, video content, hypertext protocol content, and so on, or any combination of these kinds of content. In addition, or alternatively, the item can include machine-readable code, markup language script, and so forth. For instance, an item may correspond to a software upgrade or the like.

More specifically, in one case, the term "item" may refer to a specific unit of merchandisable content, such as a book (e.g., an "eBook"), an issue of a magazine, and so on. Alternatively, an item may refer to smaller parts of a merchandisable unit, such as a chapter of a book or a song in an album. Alternatively, an item may refer to a larger compilation of component items that are related in any manner. For instance, an item can refer to multiple issues of a magazine in a particular year.

The term "entry" corresponds to information which refers to an item. For example, a list of entries may include reference information which identifies respective media items.

Certain drawings illustrate the features by showing various logic, modules, functionality, and so forth. The terms "logic," "module," "functionality" and the like generally represent hardware, software, firmware or any combination of these elements, or yet some other kind of implementation. For instance, in the case of a software implementation, the terms "logic," "module," or "functionality" may represent program code or other instructions that perform specified tasks when executed on a processing device or devices (e.g., a CPU or CPUs). The program code can be stored in one or more machine-readable media.

The term "machine-readable media" or the like refers to any kind of media for retaining information in any form, including various kinds of storage devices (magnetic, optical, static, etc.). The term "machine-readable media" also encompasses transitory forms of representing information, including various hardwired and/or wireless links for transmitting the information from one point to another.

Other figures illustrate features in signal diagram form and/or flowchart form. In this mode of explanation, certain operations are described as constituting distinct tasks performed in a certain order. Such implementations are illustrative and non-limiting. Multiple operations described in these figures can be grouped together and performed in a single operation, while certain single operations can be performed in multiple parts. Certain operations can be performed in an order that differs from the order illustrated in the figures. Certain operations can be performed by different agents than is identified in the figures. The operations shown in the figures can be implemented by software, firmware, hardware, manual processing, or other form, or by any combination of these forms.

In general, the various features described in the implementations can be regarded as optional features, meaning that these features can be omitted or replaced with other features. Further, the various implementations described herein can be supplemented by adding additional features.

In a particular embodiment, a user device includes a mode switching wireless communication module. The mode switching wireless communication module is adapted to receive a first paging signal via a first communication protocol when in a first mode of operation and to receive a second paging signal via a second communication protocol when in a second mode of operation. The user device also includes a to-do list processing module. The to-do list processing module sends a request to a remote network device in response to receiving one of the first or second paging signal. The request requests that one or more instructions be sent from the remote network device.

In a particular embodiment, a method includes receiving a paging signal in a first communication protocol while in a first mode of operation. The method also includes switching to a second mode of operation. The method further includes establishing a wireless connection to a remote network device using the first communication protocol or a second communication protocol. The method also includes sending a request to access a data list to the remote network device, the data list related to the received paging signal.

In a particular embodiment, a system includes an interface to receive a ring request message requesting that a ring message be sent to a user device. The system also includes mode specific ring logic to determine whether the user device has an active session. When the user device has an active session, the mode specific ring logic sends the ring message to the user device via active session. When the user device does not have an active session, the mode specific ring logic sends the ring message to the user device via a messaging protocol.

In a particular embodiment, a method includes receiving a paging request related to a user device. The method also includes determining whether the user device has an active session. The method further includes sending a ring message to an Internet Protocol (IP) address and paging port associated with the user device when the user device has an active session. The method also includes sending a ring message to a telephony paging address associated with the user device when the user device does not have an active session.

In a particular embodiment, an electronic reader device includes a user interface including a display and user controls to enable a user to download and read content. The electronic reader device also includes a wireless data modem including a wireless interface for communication with a server having access to downloadable content. The wireless data modem also includes logic to selectively communicate with the server via a network using either a first preferred communication protocol or a second alternate communication protocol. The electronic reader device further includes a processor coupled to the wireless data modem and to the user interface. The electronic reader device also includes a memory storing the content coupled to the processor.

FIG. 1 shows an illustrative system 100 for downloading items from an item providing system (IPS) 102 to a user device 104. At the device, the user can consume the media items in electronic form, as opposed to traditional hard-copy form. Although not shown, the user device 104 represents one of a potentially great number of user devices.

As explained above, the term "item" has broad connotation. The following list, which is non-exhaustive, identifies representative types of items:

An item may correspond to a pre-generated item, such as an eBook item. An eBook item, in turn, may refer to a book in electronic form or to one or more portions of a book (such as a chapter of a book) or to a compilation of multiple books (such as a book series), and so on. An eBook is an example of a general class of items referred to herein as pre-generated items. The term pre-generated item refers to an item that is typically (although not necessarily) provided to a user in response to the user's on-demand request for the item after it has been received and stored by the IPS 102.

An item may also correspond to a subscription-related item. A subscription-related item refers to any item that the user receives based on a schedule or based on some other type of pre-established arrangement. Without limitation, representative forms of subscription-related items include magazines, journals, newspapers, newsletters, and so on. Other forms of subscription-related items include electronic feeds of various types, such as Really Simple Syndication (RSS) feeds, and so on. In contrast to a pre-generated item, a subscription-related item is typically provided to a user in response to the receipt of item by the IPS 102, rather than the user's on-demand request for a pre-generated item.

An item can also correspond to a personal document item. A personal document item refers to a document that the user forwards in advance to the IPS 102, whereupon the IPS 102 converts the document to a device-readable format An item can also correspond to audio content, such as a piece of music, a collection of music, an audio book, and so on.

An item can also correspond to a bundle of information generated in response to a query made by the user.

An item can also correspond to machine-readable instructions, such as a software update. The term "item" can encompass yet other forms of content; the above types of items are representative.

An item can also correspond to advertising material that is downloaded to the user device by any entity or combination of entities. Various rules can be applied that govern the downloading of this item.

The item-providing system (IPS) 102 corresponds to any functionality or combination of functionality for forwarding items to the user device 104. In one case, the IPS 102 can correspond to network-accessible server-based functionality, various data stores, and/or other data processing equipment. The IPS 102 can be implemented by a single collection of functionality provided at a single physical site. Alternatively, the IPS 102 can be implemented by multiple collections of functionality, optionally provided at plural physical sites. The IPS 102 can be administered by a single entity or plural entities.

In one case, the IPS 102 corresponds to an entity which provides items to users upon the users' purchase of the items. In this role, the IPS 102 can essentially act as a bookseller or the like. In one particular commercial environment, the IPS 102 may also offer services which allow users to purchase hard-copy books for physical delivery to the users; in this context, the IPS 102 can allow users to download electronic items to respective user devices as part of its entire suite of services. In other cases, the IPS 102 corresponds to an entity which provides items to users on a non-fee basis or on some other type of alternative compensation basis. Thus, the term a "provider" of items should be construed broadly to encompass educational institutions, governmental organizations, libraries, non-profit organizations, and so on, or some cooperative combination of any two or more entities.

The user device 104 corresponds to any type of electronic processing device 104 for receiving items from the IPS 102. In one implementation, the user device 104 is readily portable, meaning that the user can freely carry the user device 104 from one location to another. In one particular case, the user device is designed as a book reader device, also known as an eBook reader device. In this case, the user device 104 functions as the electronic counterpart of a paper-based book. The user can hold the user device 104 in a manner that is similar to a physical book, electronically turn the pages of the book, and so on. Without limitation, FIG. 1 illustrates a particular type of eBook reader device. Additional details regarding this particular type of reader device are provided below. Alternatively, the user device 104 can correspond to any other type of portable devices, such as a portable music player, a personal digital assistant (PDA), a mobile telephone, a game module, a laptop computer, and so on, and/or any combination of these types of devices. Alternatively, or in addition, the user device 104 can correspond to a device that is not readily portable, such as a personal computer, set-top box associated with a television, a gaming console, and so on.

A communication infrastructure 106 bi-directionally couples the IPS 102 to the user device 104. Namely, the IPS 102 downloads items, upgrades, and/or other information to the user device 104 via the communication infrastructure 106. The IPS 102 receives various instructions and other data from the user device 104 via the communication infrastructure 106.

The communication infrastructure 106 can include any combination of communication functionality, including any combination of hardwired links and/or wireless links, etc. For instance, FIG. 2 (to be discussed below in turn) shows one implementation of the communication infrastructure 106 which includes a combination of a wide area network (WAN) and wireless infrastructure. By virtue of the wireless component of the communication infrastructure 106, the user can use the user device 104 to purchase items and consume items without being tethered to the IPS 102 via hardwired links. Thus, for instance, a user can purchase and consume an eBook using the device while riding in a car as a passenger, while hiking in park, while boating on a lake, and so forth.

In a particular embodiment, the user device 104 is a mode switching user device. That is, the user device can switch between two or more communication modes to facilitate communication between the user device 104 and the IPS 102. In a particular case, the two or more communication modes are both wireless data communication modes. For example, a first communication mode may be a 1x Radio Transmission Technology ("1xRTT") communication mode and a second communication mode may be an Evolution Data Optimized ("EV-DO") communication mode. The user device 104 can switch between the two or more communication modes as needed to achieve improved data communication rates and conserve power. Additionally, the user device 104 can switch between the communication modes based on availability of data networks conforming to the communication modes. That is, if a first data network using the first communication mode and a second data network using the second data mode are both available, the user device 104 can select the communication mode that best achieves a particular goal, e.g., power conservation or high data rate.

FIG. 1 shows four exchanges which describe, in very high-level form, part of a procedure for downloading items to the user. In a first message 108, the IPS 102 can send a wake-up message to the user device 104. The wake-up message 108 instructs the user device 104 to download one or more items from the IPS 102 and/or perform other actions. In a second message 110, the user device 104 requests the IPS 102 to supply a list that identifies one or more items to be downloaded. The user device receives the list in response to the second message 110 (where FIG. 1 does not specifically identify the transmission of the list from the IPS 102 to the user device 104). In a third message 112, the user device sends a request to the IPS 102, asking the IPS 102 to download the items identified in the list. In a fourth message 114, the IPS 102 downloads the requested items to the user device 104. In effect, the user device 104 retrieves the items using a pull approach, but the pull approach is initiated by a push operation (by virtue of the IPS 102 "pushing" a wake-up message 108 to the user device 104).

In one case, the wake-up message 108 may correspond to a certain type of voice message, such as a telephone ring signal. In this case, the wake-up message 108 is also referred to as a TelePhone Home (TPH) signal or paging signal. In a particular embodiment, a TPH signal can be used when the user device 104 does not have an active session open with the communication infrastructure 106 when the wake-up message 108 is sent. For example, a TPH signal can be sent when the user device 104 is in a sleep state.

In another case, the wake-up message 108 may correspond to a data message sent to an Internet Protocol (IP) address and port associated with the user device 104 in an active session. That is, when the user device 104 in engaged in an active session with the communication infrastructure 106, a particular port of the user device 104 can be designated for receiving wake-up messages.

In one case, the user device 104 is configured to receive and act on the wake-up message 108 without formally answering the wake-up message 108. In some environments, a wireless provider system charges a fee when a call is answered, but not if a user device is called and does not answer. Thus, the strategy of ringing the user device 104 without an answer may allow the IPS 102 to communicate instructions to the user device 104 without incurring a fee.

Figure 2:
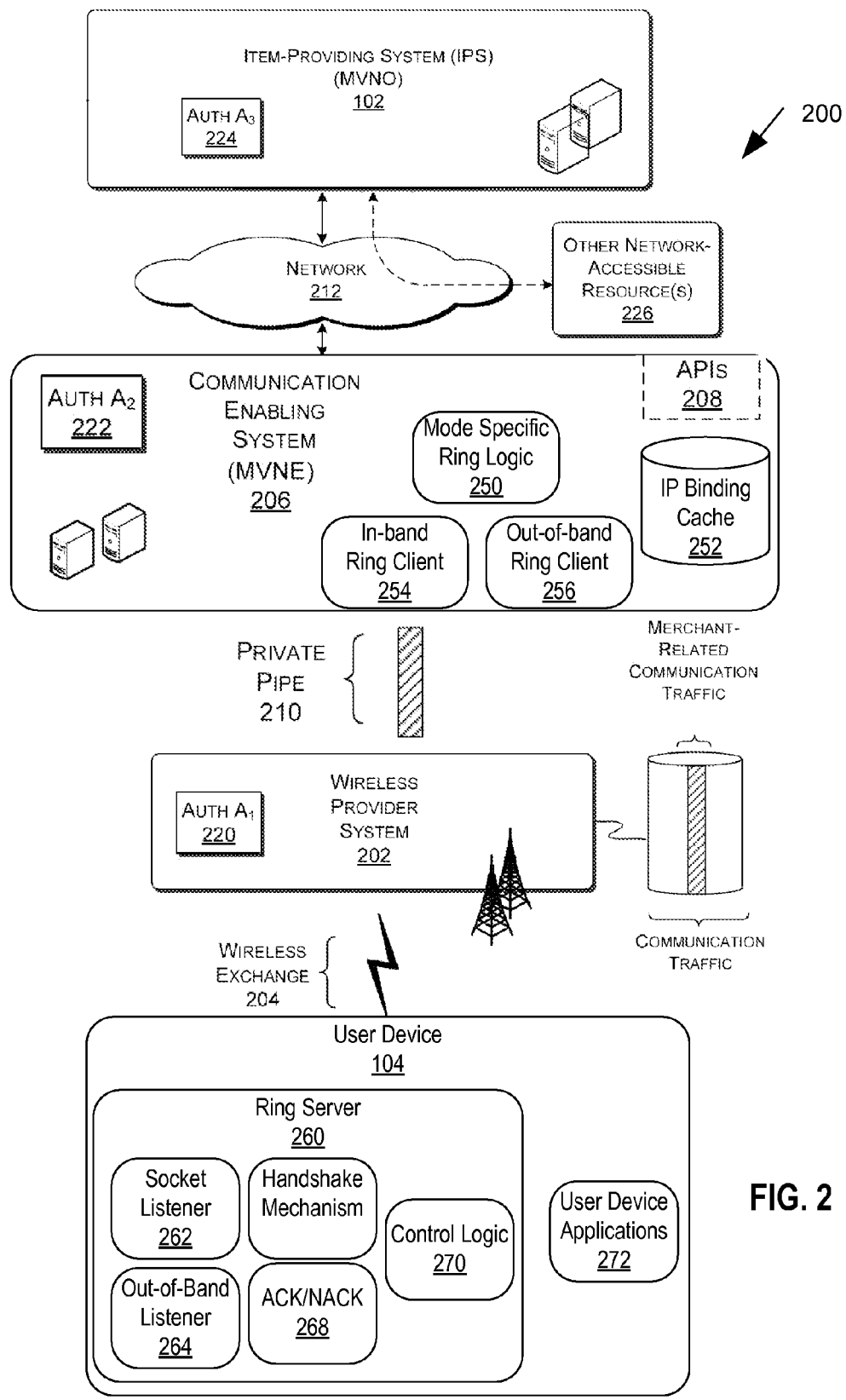
FIG. 2 shows one illustrative implementation of the system of FIG. 1 that employs wireless communication.

FIG. 2 shows a system 200 which represents one illustrative embodiment of the general system 100 of FIG. 1. By way of overview, the system 200 includes the components identified above, namely an item-providing system (IPS) 102 coupled to a user device 104 via communication infrastructure 106.

The communication infrastructure 106 can include multiple components. A first component is a wireless provider system 202. The wireless provider system 202 corresponds to any infrastructure for providing a wireless exchange 204 with the user device 104. In one case, the wireless provider system 202 can be implemented using various data processing equipment, communication towers, and so forth (not shown). The wireless provider system 202 can use any form of electromagnetic energy to transfer signals, such as, without limitation, radio-wave signals. The wireless provider system 202 can use any communication technology to transfer signals, such as, without limitation, spread spectrum technology, implemented, for instance, using the Code Division Multiple Access (CDMA) protocol. The wireless provider system 202 can be administered by a single entity or by a cooperative combination of multiple entities.

The communication infrastructure 106 also includes a communication-enabling system 206. One purpose of the communication-enabling system 206 is to serve as an intermediary in passing information between the IPS 102 and the wireless provider system 202. The communication-enabling system 206 can be implemented in any manner, such as, without limitation, by one or more server-type computers, data stores, and/or other data processing equipment. The communication enabling system 206 can expose one or more application programming interfaces (APIs) 208. The IPS 102 can call on the APIs 208 to perform various respective functions. For example, the IPS 102 can send a paging request for a particular user device to the communication enabling system 206 via the APIs 208. The APIs interact with mode specific ring logic 250 to send a wake up message to the particular user device based on the status of the user device.

The communication enabling system 206 communicates with the wireless provider system 202 via a dedicated channel 210, also referred to as a dedicated communication pipe. The channel 210 is dedicated in the sense that it is exclusively used to transfer information between the communication-enabling system 206 and the wireless provider system 202. In contrast, the communication enabling system 206 can communicate with the IPS 102 via a non-dedicated communication mechanism, such as a public wide area network (WAN) 212. For example, the WAN 212 may represent the Internet.

The communication enabling system 206 can serve as an adaptor. For instance, assume that, in one particular implementation, the IPS 102 acts as a data center which is set up to receive information via a wide area public network. Assume further that the wireless provider system 202 is set up to interact with clients via a private pipe. The communication enabling system 206 interacts with the IPS 102 via the wide area network 212 and the wireless provider system 202 via the private pipe 210, thus accommodating the processing preferences of the IPS 102 and the wireless provider system 202. By virtue of this intermediary role, the communication-enabling system 206 can be referred to as a Mobile Virtual Network Enabler (MVNE), while the IPS 102 can be referred to as a Mobile Virtual Network Operator (MVNO).

The system 200 of FIG. 2 also provides various security-related features. According to one feature, the system 200 applies multiple layers of authentication. Namely, the wireless provider system 202 can include authentication functionality A1 220 that performs a first level of authentication. The communication-enabling system 206 provides authentication functionality A2 222 that performs a second level of authentication. The IPS 102 provides authentication functionality A3 224 that performs a third layer of authentication. Each layer of authentication performs checking to ensure that the user device that is attempting to interact with the IPS 102 is duly authorized to access the IPS 102. The distributed nature of the authentication helps ensure that someone who has obtained a user device through improper means cannot gain access to the services provided by the IPS 102.

According to another security-related feature, the system 200 can provide various constraints which restrict the manner in which a user can use the device 104. For example, the communication-enabling system 206 can be configured such that it will allow user devices to access only one or more predetermined addresses associated with the IPS 102. This means that, in one case, a user cannot use the user device 104 to directly access a network-accessible site without being first routed through the IPS 102. This prevents the user from using the user device 104 as an unrestricted broadband interface to network-accessible resources.

More specifically, the IPS 102 can include a web browsing proxy. When the user attempts to access a network-accessible resource 226, the communication enabling system 206 first directs the user to the browsing proxy module. The browsing proxy module can then either deny the request or accept the request by allowing the user to access the network-accessible resource 226. The browsing proxy module can apply various rules in determining whether to deny or accept the request to access the network-accessible resource 226. In this manner, the communication-enabling system 206 and the IPS 102 do not permit the user to directly access the network accessible resources.

In a particular embodiment, the communication enabling system 206 includes mode specific ring logic 250. In response to a paging request from the IPS 102, the mode specific ring logic 250 accesses a state indicator (e.g., at memory 252) related to the representative user device 104 to be paged and determines the state of a user device 104. The state indicator may indicate whether the user device is an active mode or in a dormant mode (e.g., a sleep mode). For example, the state indicator can indicate whether the user device is engaged in an active communication session. The mode specific ring logic 250 passes the paging request to an in-band ring client 254 or to an out-of-band ring client 256.

The out-of-band ring client 256 is adapted to send TPH signals or "wake up" messages to user devices that are not in active communication sessions. In a particular embodiment, the representative user devices 104 can receive paging messages via the TPH signal even when the user device 104 is not in an active communication session. For example, the user device 104 can receive paging messages via a telephony paging protocol when it is not in an active communication session. In response to a page request from the mode specific ring logic 250, the out-of-band ring client 256 accesses the memory 252 to determine a telephony address associated with the user device 104 to be paged. The out-of-band ring client 256 sends a page message to the user device 104 using the telephony address to "wake up" the user device.

The in-band ring client 254 is adapted to send paging messages to user devices that are in active communication sessions. In a particular embodiment, the representative user device 104 listens for paging messages at a designated paging socket or port when it is in an active communication session. In response to a page request from the mode specific ring logic 250, the in-band ring client 254 accesses an IP binding cache (e.g., at memory 252) to determine an IP address associated with the user device to be paged and to identify the paging socket for the user device 104. The in-band ring client 254 sends a page message to the user device 104 via the IP address and paging socket.

The mode specific ring logic 250 may also implement a backup notification procedure to contact user devices that do not respond to an initial paging message. For example, when a paging message is sent by the in-band ring client 254 to the representative user device 104 while the user device 104 is engaged in an active communication session, the in-band ring client 254 listens for an acknowledgement (ACK) message indicating that the paging message was received. If the ACK message is not received, the in-band ring client 254 notifies the mode specific ring logic 250. The mode specific ring logic 250 sends a page request to the out-of-band ring client 256, which sends a paging message to the user device 104 via the telephony paging protocol.

In a particular embodiment, the user device 104 includes a ring server 260 and user device applications 272. The user device applications 272 perform the various functions of the user device 104, such as the various functions described with reference to FIG. 3.

The ring server 260 is adapted to receive and process paging messages from the communication enabling system 206. The ring server 260 includes a socket listener 262 and an out-of-band listener 264. The socket listener 262 is adapted to monitor a designated communication port (or socket) while the user device 104 is engaged in a communication session. The out-of-band listener 264 is adapted to listen for paging messages received via a telephony protocol (e.g., TPH signals). The out-of-band listener 264 may listen for paging messages whether or not the user device 104 is engaged in a communication session.

When a message is received by the socket listener 262, control logic 270 examines the message to determine whether to send an acknowledgement (ACK) message. If an ACK message is to be sent, the ACK/NACK module 268 is invoked to send the ACK message to the communication enabling system 206. In a particular embodiment, the control logic 270 also implements additional procedures depending on the state of the user device 104. For example, the user device 104 may contact the IPS 102 to download a list of instructions.

Figure 5:
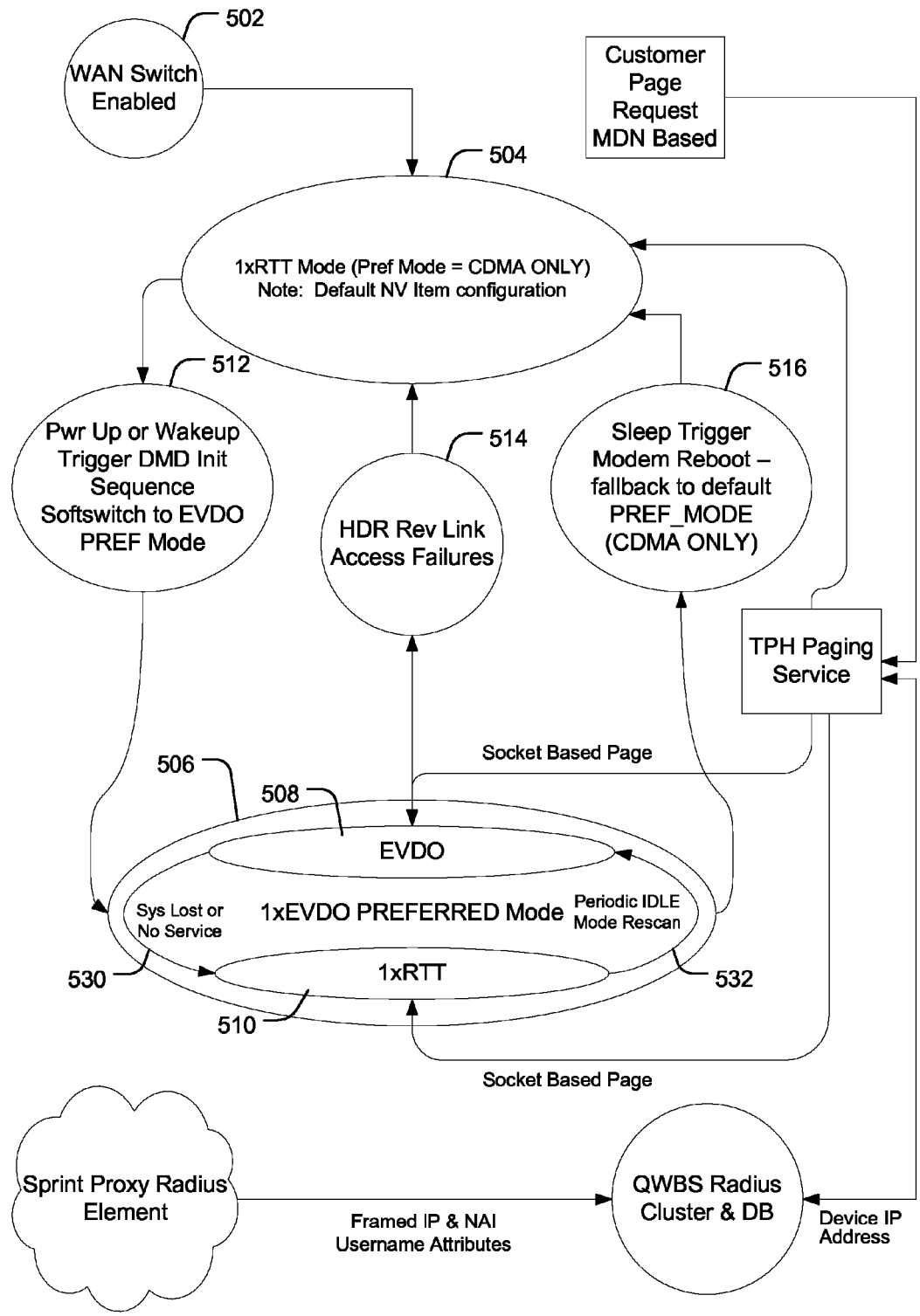
FIG. 5 shows an illustrative embodiment of a state diagram of a wireless user device modem.

When a message is received by the out-of-band listener 264, the control logic 270 examines the message to determine whether to implement a wake up procedure, as discussed further with reference to FIG. 5. The wake procedure causes the user device to open a communication session with the communication enabling system 206. The control logic 270 may also determine that one or more additional procedures should be implemented. For example, the control logic 270 can cause the user device 104 to access the IPS 102 to retrieve one or more instructions, such as instructions to retrieve one or more items from the IPS 102.

Figure 3:
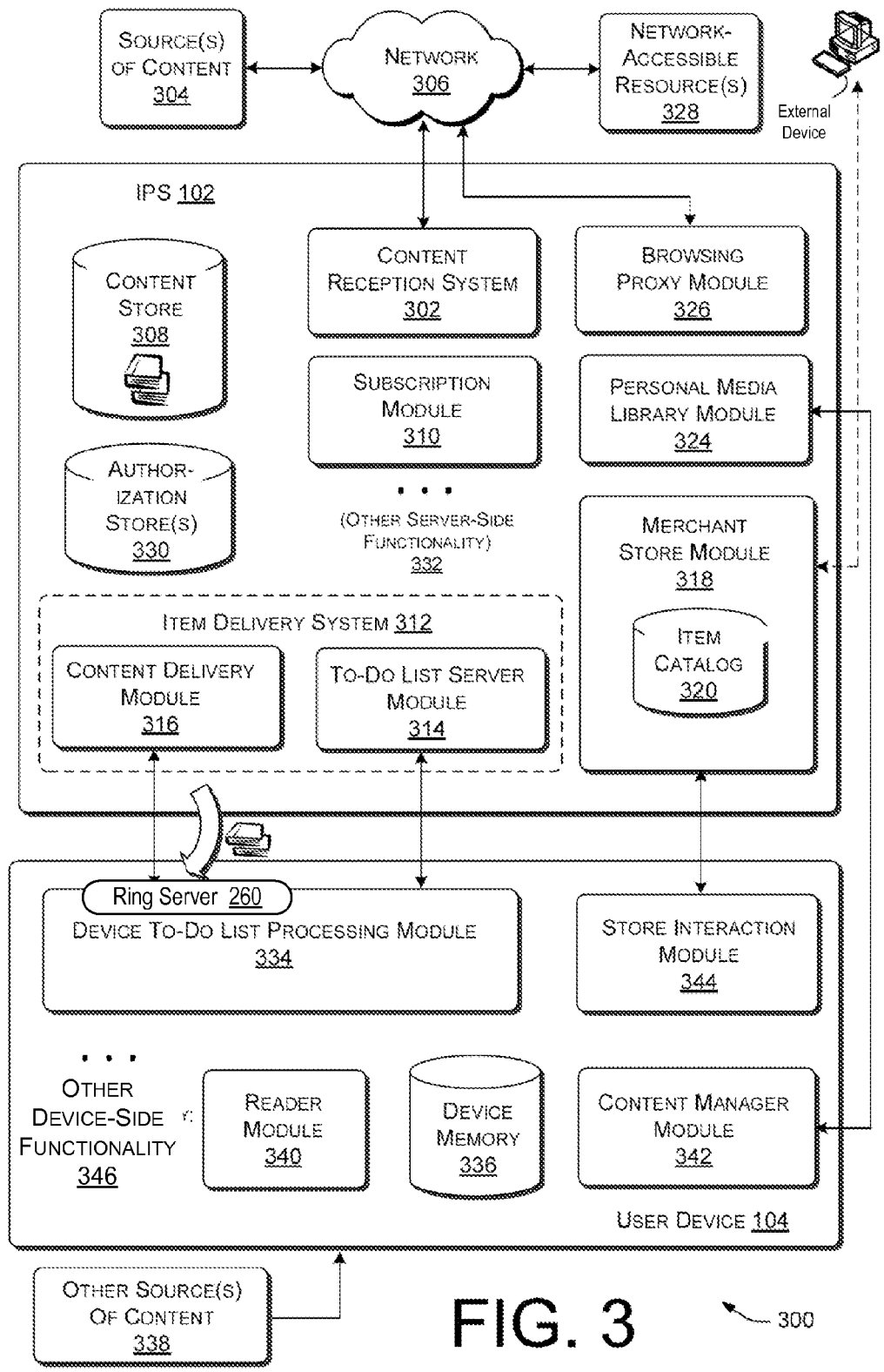
FIG. 3 shows an illustrative item-providing system (IPS) and an illustrative user device for use in the system of FIG. 2.

FIG. 3 shows a system 300 that includes a more detailed depiction of the IPS 102 and the user device 104 (which were introduced in FIGS. 1 and 2). The communication infrastructure 106 that facilitates communications between the user device 104 and the IPS 102 is not shown.

Addressing the details of the IPS 102 first, this system 102 performs various functions. Different modules are associated with these different functions. One module is a content reception system 302. The content reception system 302 receives content from one or more sources 304. The sources 304 may represent any type of provider of content, such as eBook publishers, newspaper publishers, other publics of periodicals, various feed sources, music sources, and so on.

The sources 304 may be administered by a single entity or may be administered by separate respective entities. Further, the entity that administers the IPS 102 may correspond to an entity which administers one or more of the sources 304. Alternatively, or in addition, the entity that administers the IPS 102 may interact with one or more separate entities that administer one or more respective sources 304. In the latter case, the entity that administers the IPS 102 can enter into an agreement with the source entities to receive content from these source entities.

The content creation system 302 can obtain the content through various mechanisms. In one case, the content creation system 302 obtains the content via one or more networks 306. The networks 306 can represent a wide area network (WAN), such as the Internet, a local area network (LAN), or some combination thereof. The content reception system 302 can receive the information in various forms using any protocol or combination of protocols. For instance, the content reception system 302 can receive the information by making a Hypertext Transfer Protocol (HTTP) request, by making a File Transfer Protocol (FTP) request, by receiving a feed (e.g., an RSS feed), and so forth. More generally, the content reception system 302 can proactively request the content in and on-demand manner (based on a pull method of information transfer). Or the content reception system 302 can receive the content in response to the independent transfer operations performed by the sources 304 (based on a push method of information transfer). Alternatively, the content reception system 302 can use a combination of pull and push transfer mechanisms to receive the content.

The content reception system 302 receives content in the form of items. Without limitation, the items can include eBooks, audio books, music, magazine issues, journal issues, newspaper editions, various feeds, and so forth. In one case, the content reception system 302 may receive some items expressed in a format that is not readable by the user device 104 (where the user device may optionally be configured to receive, process, and present content expressed in one or more predefined formats). To address this situation, the content reception system 302 can convert the items from their original format into a device-readable format (such as, without limitation, the .mobi format).

The content reception system 302 can store the items that it receives (and optionally converts) in a content store 308. The content store 308 can include one or more storage systems for retaining items in electronic form, located at a single site or distributed over plural sites, administered by one or more entities.

Section B (below) provides additional information regarding the operation of the content reception system 302. By way of preview, the content reception system 302 can include separate modules for handling pre-generated items (such as eBooks), subscription-related items, and personal items.

The IPS 104 also includes a subscription module 310. The subscription module 310 manages users' subscriptions to subscription-related items. Generally, a subscription entitles a user to receive one or more subscription-related items (which may yet to be received and stored by the content reception system 302) based on any type of consideration or combination of considerations. Without limitation, subscription-related items include magazines, journals, newsletters, newspapers, various feeds, and so forth. Users may register to receive subscription-related items by purchasing such subscriptions. Alternatively, or in addition, the IPS 102 can automatically register users to receive subscription-related items without the involvement of the users (and possibly without the approval of the users). The latter scenario may be appropriate in the case in which the IPS 102 (or some other entity) registers a user to receive weekly unsolicited advertisements, newsletters, and so on. The system 300 may allow the user to opt out of receiving such unsolicited information.

The IPS 104 can consult the subscription module 310 to determine what user devices should receive a newly-received subscription-related item. For instance, upon receiving an electronic issue of the magazine Forbes, the IPS 102 can consult the subscription module 310 to determine the users who have paid to receive this magazine. The IPS 102 can then send the issue to the appropriate user devices.

An item delivery system 312 represents the functionality which actually performs the transfer of content to the user device 104. In one illustrative representation, the item-delivery system 312 includes two components: a to-do list server module 314; and a content delivery module 316. The to-do list server module 314 generally provides instructions for the user device 104 to retrieve items and perform other operations. The content delivery module 316 allows the user device to obtain the items identified in the instructions received from the to-do list server module 314.

More specifically, in a first phase of information retrieval, the to-do list server module 314 sends a wake-up message to the user device 104. As described above, in one illustrative implementation, the to-do list server module 314 may send the wake-up message as a telephone ring signal or as an IP message. The ring server 260 of the user device 104 receives the wake-up message. The user device 104 responds to the wake-up signal by waking up (if "asleep"), which may involve switching from a first power state to a second power state (where the second power state consumes more power than the first power state). In a particular embodiment, when the user device 104 is asleep, the ring server 260 only listens for wake-up messages sent as telephony ring signals. In this embodiment, when the user device 104 is awake and has an active session open, the ring server 260 listens for wake-up messages addressed to a particular Internet protocol address and socket designated for paging messages. The user device 104 may optionally respond to the wake-up signal without formally answering the signal, which avoids or reduces a fee associated with the wireless message. The user device 104 then contacts the to-do list server module 314 to request instructions from the server module 314. More specifically, for each user device, the to-do list server module 314 maintains a list or queue of entries. An entry provides an instruction for a user device to perform an action. One such action (e.g., a GET action) directs the user device 104 to retrieve an item. In the first phase, the user device 104 generally retrieves n such entries.

In a second phase of the downloading procedure, the user device 104 contacts the content delivery module 316 to retrieve one or more items identified in the GET-related entries. After receiving the wake-up message, the item delivery system 312 interacts with the user device 102 in a data mode, e.g., using a Hypertext Transfer Protocol (HTTP), or some other protocol or combination of protocols. The downloading procedure is described in additional detail below.

The IPS 102 also includes a merchant store module 318. The merchant store module 318 provides access to an item catalog 320, which, in turn, provides information regarding a plurality of items (such as eBooks, audio books, subscription-related items, and so on). The merchant store module 318 includes functionality that allows a user to search and browse though the item catalog 320. The merchant store module 318 can also include functionality that allows a user to purchase items (or, more generally, acquire items based on any terms).

The IPS 102 also includes a personal media library module 324. The media library module 324 stores, for each user, a list of the user's prior purchases. The media library module 324 identifies an item that the user has purchased by providing a link to the item in the content store 308. The user device 104 may access the personal media library module 324 to initiate downloading of an item that has been previously purchased by the user but has been deleted by the user device 104 for any reason.

The IPS 102 also includes a browsing proxy module 326. The browsing proxy module 326 allows the user to access one or more network-accessible resources 328 via a browser module that is resident on the user device 104.

The IPS 102 also includes various security-related features, such as one or more authorization stores 330. The authorization stores 330 provide information which enables various components of the IPS 102 to determine whether to allow the user to perform various functions, such as access the merchant store module 318, download items, change settings, and so on.

The above-enumerated list of modules is representative and is not exhaustive of the types of functions performed by the IPS 102. As indicated by the label "Other Server-Side Functionality" 332, the IPS 102 can include additional functions.

Now turning to the device-side features of the system 300, the user device 104 includes a device to-do list processing module 334. The purpose of the to-do list processing module 334 is to interact with the item delivery system 312 to download items from the item delivery system 312. Namely, in a first phase of the downloading procedure, the ring server 260 of the to-do list processing module 334 receives a wake-up message from the to-do list server module 314, which prompts it to wake up (if "asleep") and to contact the to-do list server module 314 to retrieve a set of n entries. Each entry includes an instruction which directs the to-do list processing module 334 to perform an action. In a second phase, for a GET-type entry, the to-do list processing module 334 contacts the content delivery module 316 to request and retrieve an item identified by the GET-type entry.

Upon downloading an item, the user device 104 can store the item in a device-side memory 336, which may represent flash-type memory or any other type of memory. Although not shown, the user device 104 can also retrieve information from any other source of content 338. In one illustrative case, the other source of content 338 may represent a personal computer or other data processing device, which transfers the content to the user device via a Universal Serial Bus (USB) connection and/or any other type(s) of connection(s). In this scenario, the other source of content 338, in turn, may receive the items from the IPS 102 (or other source) via hardwired connection (e.g., non-wireless connection). For example, to receive an audio book, the user may use a personal computer to download the audio book from a network-accessible source of such content. The user may then transfer the audio book to the user device 104 via USB connection. In another illustrative case, the other source of content 338 may represent a portable memory module of any type, such as an SD-type memory.

The user device 104 also includes a reader module 340. The illustrative purpose of the reader module 340 is to present media items for consumption by the user using the user device 104. For example, the reader module 340 can be used to display an eBook to the user to provide a user experience which simulates the reading of a paper-based physical book.

The user device 104 also includes a content manager module 342. The purpose of the content manager module 342 is to allow the user to manage items that are available for consumption using the user device 104. For example, the content manager module 342 allows the user to view a list of items that can be consumed. The content manager module 342 also identifies the sources of respective items: one such source corresponds to the device memory 336; another source corresponds to an attached portable memory (e.g., represented by an other source 338); another source corresponds to items identified in the personal media library module 324. The content manager module 342 allows the user to filter and sort the items in various ways. For example, the user can selectively view items that originate from the device store 336.

The user device 104 also includes a store interaction module 344. The store interaction module 344 allows the user device 104 to interact with the merchant store module 318. The user may engage the store interaction module 344 to search and browse through items, to purchase items, to read and author customer reviews, and so on. As described above, the user can also use a personal computer or the like to interact with the merchant store module 318 via hardwired links.

The above-enumerated list of modules is representative and is not exhaustive of the types of functions performed by the user device 104. As indicated by the label "Other Device-Side Functionality" 346, the user device 104 can include additional functions.

Figure 4:
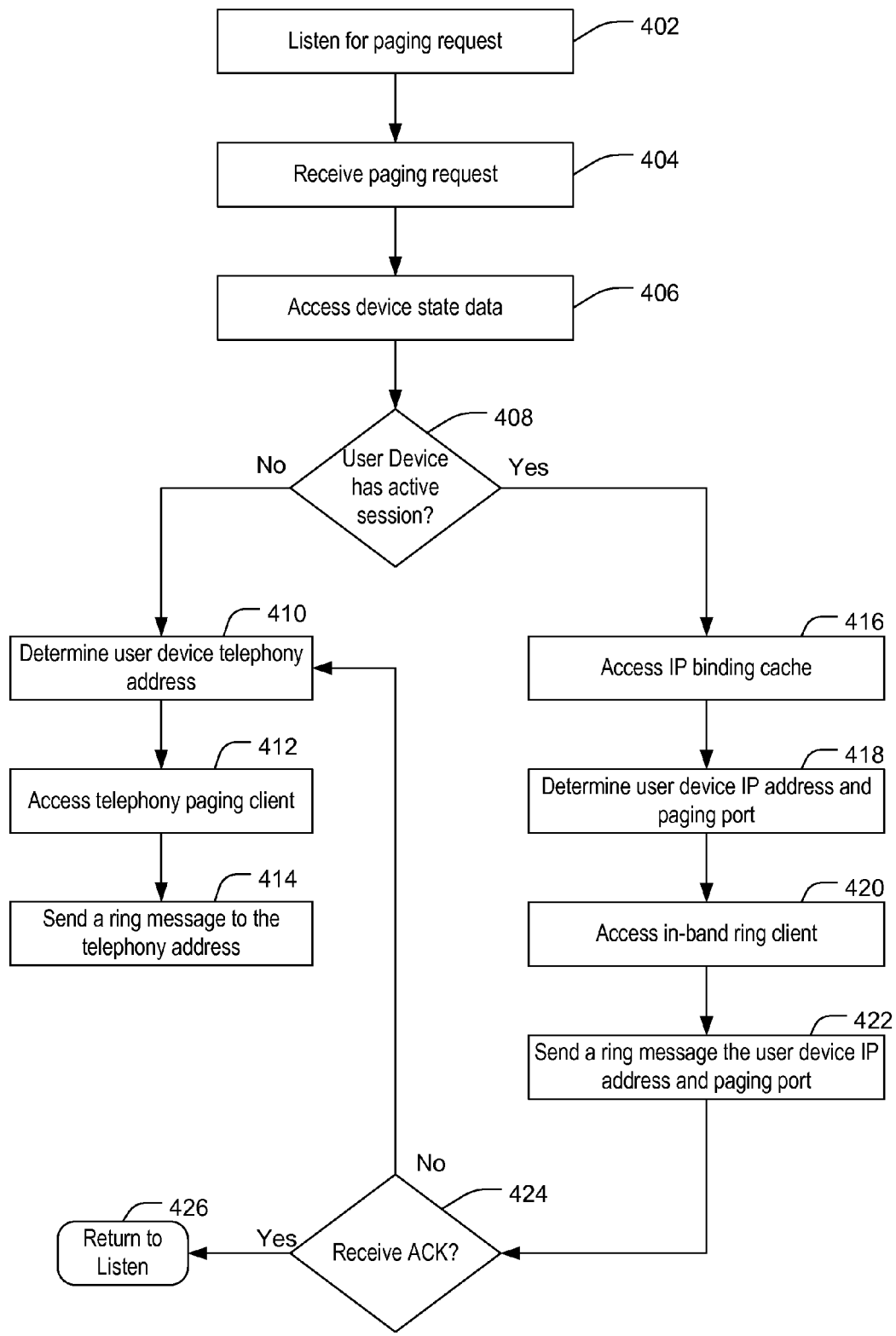
FIG. 4 shows a flow chart of an illustrative embodiment of a method of paging a wireless user device.

FIG. 4 shows a flow chart of a particular embodiment of a method of paging a user device, such as representative user device 104. The method, at 402, includes listening for a paging request. For example, the IPS 102 can send a paging request to the communication enabling system 206. The paging request may indicate that a wake-up message or paging message should be sent to a particular user device 104.

At 404, a paging request is received. The communication enabling system 206 may invoke mode specific ring logic 250 to determine how to page the user device 104. At 406, the mode specific ring logic 250 accesses state data related to the particular user device 104. The state data indicates whether the particular user device 104 is in an active mode. The state data is used to determine whether the user device is in an active session with the communication enabling system 206, at 408.

When the user device does not have an active session, the mode specific ring logic 250 determines a telephony address associated with the particular user device 104, at 410. At 412, the mode specific ring logic 250 accesses a telephony paging client, also referred to as an out-of-band ring client 256. The telephony address of the particular user device 104 is passed to the telephony paging client, which sends a ring message to the telephony address, at 414.

When the user device has an active session, the mode specific ring logic 250 accesses an IP binding cache 252, at 416, and determines a telephony address and paging port associated with the particular user device 104, at 418. At 420, the mode specific ring logic 250 accesses an in-band ring client 254. The in-band ring client 254 sends a ring message to the user device IP address and paging port, at 422.

The mode specific ring logic 250 listens for an acknowledgement (ACK) that the ring message was received, at 424. If no ACK is received, the mode specific ring logic 250 reverts to a backup paging protocol by determining the user device telephony address, at 410, accessing the telephony paging client, at 412, and sending a ring message to the telephony address, at 414. If the ACK is received, the communication enabling system 206 returns to listening for a paging request, at 426.

In a particular embodiment, a wireless modem of the user device 104 is adapted to selectively communicate with a wireless provider system 202 using either a 1xRTT Mode (i.e., "the 1x mode") or a Evolution-Data Optimized (EVDO) Preferred Mode ("the EVDO mode"). The 1x mode ("1 times radio transmission technology" mode) uses a conventional 1xRTT protocol. The EVDO mode offers enhanced data capacity and higher data rates. In some instances, the EVDO mode provides data rates as much as 10 times faster than the 1xRTT mode.

Referring to FIG. 5, when a wide area network switch is enabled 502, the wireless data modem (Modem) enters a 1xRTT only state 504. During a power up or wake up trigger event 512 a Division Multiplex Daemon application ("DM-Daemon") is initialized and, during initialization, the DMDaemon triggers a soft switch that changes the state of the Modem from the 1xRTT only state 504 to an EVDO preferred state 506.

In the EVDO preferred state 506, the Modem attempts to connect to a network in the EVDO mode 508. When connected in the EVDO mode 508, the Modem uses an EVDO protocol to communicate with a network via Internet Protocol (IP) data packets. In particular, the EVDO protocol includes use of an IP address of a particular network port to send and receive data packets. When the Modem is in the EVDO preferred state 506 and is connected to a network in the EVDO mode 508, the Modem monitors and receives EVDO-based pages, but does not monitor or receive 1xRTT-based pages, since the Modem is not synchronized to the 1xRTT protocol when in the EVDO mode.

After an EVDO connection is established, the EVDO connection to the network or service may be temporarily lost. For example, the device may be moved out of a signal area or the signal may be temporarily lost or blocked. When the EVDO connection is lost, the Modem scans for previous or alternate systems and in the absence of an EVDO signal 530, the Modem may acquire a temporary 1xRTT mode 510 within the EVDO preferred state 506. In this temporary 1xRTT mode 510, the Modem monitors and receives 1xRTT-based pages and is not synchronized or capable of receiving EVDO-based pages.

While in the temporary 1xRTT mode 510, when the Modem is idle, the Modem periodically stops monitoring and receiving 1xRTT-based pages and performs a mode rescan operation 532 to attempt to reestablish an EVDO connection. During this rescan operation, the Modem loses synch as it abandons the temporary 1xRTT mode 510 in search for a more preferred system. In particular, the Modem scans for a EVDO pilot signal indicating that an EVDO connection may be established. If an EVDO pilot signal is detected, the Modem attempts to establish an EVDO connection.

In contrast, if, after a number of rescans, an EVDO pilot signal is not detected, the Modem may resynch to the original temporary 1xRTT only state 510. In particular, when the Modem is unable to reestablish a connection to a network in the EVDO preferred state 506 over a number of retries it will continue to search via a Uniform Out of Service ("UOOS") scan process. When a call is attempted, the DMDaemon of the Modem can trigger a soft switch 514 to change the operating state back to the 1xRTT only state 504. In the 1xRTT only state 504, the Modem monitors and receives 1xRTT-based pages but is incapable of monitoring or receiving EVDO-based pages.

Alternatively, when the Electronic Reader remains inactive for a period of time, a modem reboot operation is initiated 516, and the Modem changes its state from the EVDO preferred state 506 to the 1xRTT only state 504. For example, to conserve battery power, the Electronic Reader may go to sleep after a period of time of non-use. In general, after a period of inactivity, a tethered application processor (i.e., a processor that is idle in processing a particular application) can provide a sleep trigger 516. The sleep trigger causes the modem to reboot 516, reverting the Modem to the 1xRTT only state 504. In this example, the application processor and the DMDaemon can be powered down to conserve power.

When subscription content becomes available, a 1xRTT page is processed by a listener application, which toggles a general processor input/output (I/O) line to provide an interrupt to the application processor. In response to the general processor I/O interrupt trigger, the application processor boots and enables the DMDaemon. The DMDaemon initialization sequence is repeated, switching the 1xEV-DO modem from the 1xRTT only state 504 to the EVDO preferred state 506 (i.e., the preferred operating state).

The Modem is adapted to mode switch between the 1x mode and the EVDO mode via full acquisition process, but is not adapted to receive pages while switching. Further, the Modem implicitly de-registers from either the 1xRTT network or the EVDO network when switching between networks. Thus, the Modem that is used in the Electronic Reader (i.e., user device 104) is able to communicate with two different systems, but is only subscribed to and able to monitor messages from one of the systems at a time. The two different systems are not monitored for pages simultaneously, but rather separately and independently.

Additionally, the Modem that is used in the Electronic Reader does not simultaneously register with and monitor traffic on two networks at the same time. Instead, the Modem attempts to establish a connection using a preferred mode (i.e., the EVDO mode). If the EVDO attempt fails, the Modem attempts to establish a connection using the 1x mode. Thus, the Modem participates in communications via only one network at a time.

Figure 6:
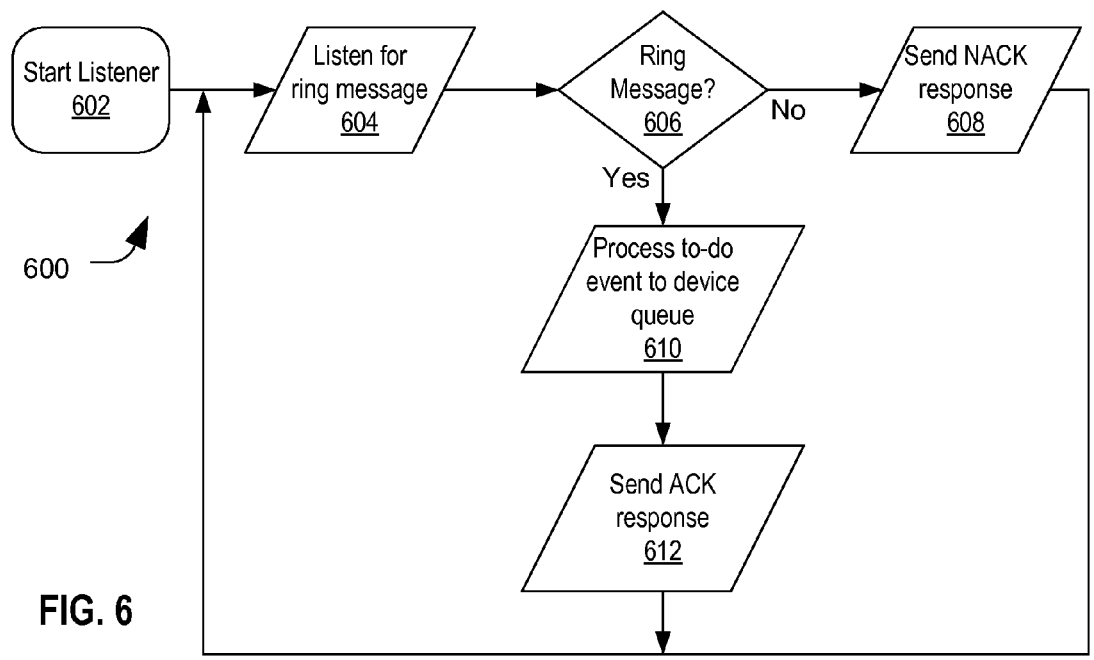
FIG. 6 shows a flow chart of an illustrative embodiment of a method of listening for a paging message.

FIG. 6 shows a flow chart of an illustrative embodiment of a method of listening for a paging message, the method generally designated 600. In a particular embodiment, method 600 runs as a background task within the user device 104. At 602, the ring server 260 starts this background thread process by starting at least the in-band listener 262.

At 604, the in-band listener 262 listens for ring messages at the designated port or socket. The in-band listener 262 blocks, waiting for a message to arrive via the data network, e.g., from the in-band ring client 254.

When a message is received, the message is parsed, at 606, to determine whether the message is a ring message. If the message is a ring message, the method 600 proceeds to 610, to process a "to-do" list event. For example, the to-do list processing module 334 may be invoked, and may execute a process as described further with respect to FIG. 11.

If the method 600 executes successfully to this point, an ACK message is sent, at 612. If the method 600 fails to execute, e.g., the message is not a ring message, or the message cannot be processed by the to-do list processing module 334, a NACK messages is returned, at 608.

Figure 7:
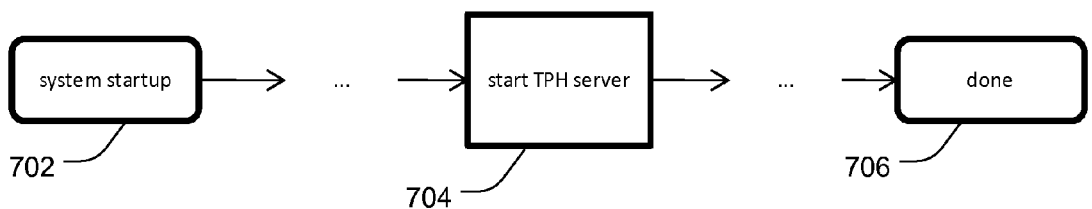
FIG. 7 shows a flow chart of a first illustrative embodiment of a method of starting up a user device.

FIG. 7 shows a flow chart of a first illustrative embodiment of a method of starting up a user device 104. In particular, FIG. 7 illustrates how the method 600 starts within the context of the user device 104 startup. At 702, initial power up of the user device 104 occurs. At 704, a DMDaemon issues a command to start the ring server 260, which is sometimes also referred to as the TPH server. Additional user device 104 systems and processes may be initiated before the TPH server is initiated, after the TPH server is initiated, or both. At 706, the user device 104 startup process is complete.

Figure 8:
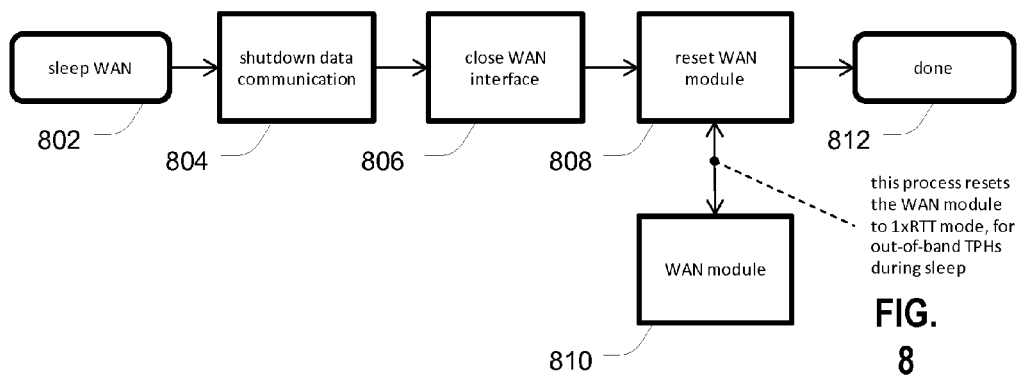
FIG. 8 shows a flow chart of an illustrative embodiment of a method of placing a user device in a sleep mode.

FIG. 8 shows a flow chart of an illustrative embodiment of a method of placing a user device in a sleep mode. In a particular embodiment, when the user device 104 remains inactive for a period of time, a "sleep WAN" or simply sleep process is initiated, a 802, to change the user device state to a sleep state. The sleep state may conserve battery power. When the sleep process is initiated, data communications are shut down, at 804, and the WAN interface is closed, at 806. For example, active communications sessions between the user device 104 and the communication enabling system 206 are torn down. The WAN module 810 (including the modem discussed with reference to FIG. 5) is reset, at 808. The reset causes the WAN module 810 to reboot, and revert to the 1xRTT only state. At 812, the sleep process is complete.

Figure 9:
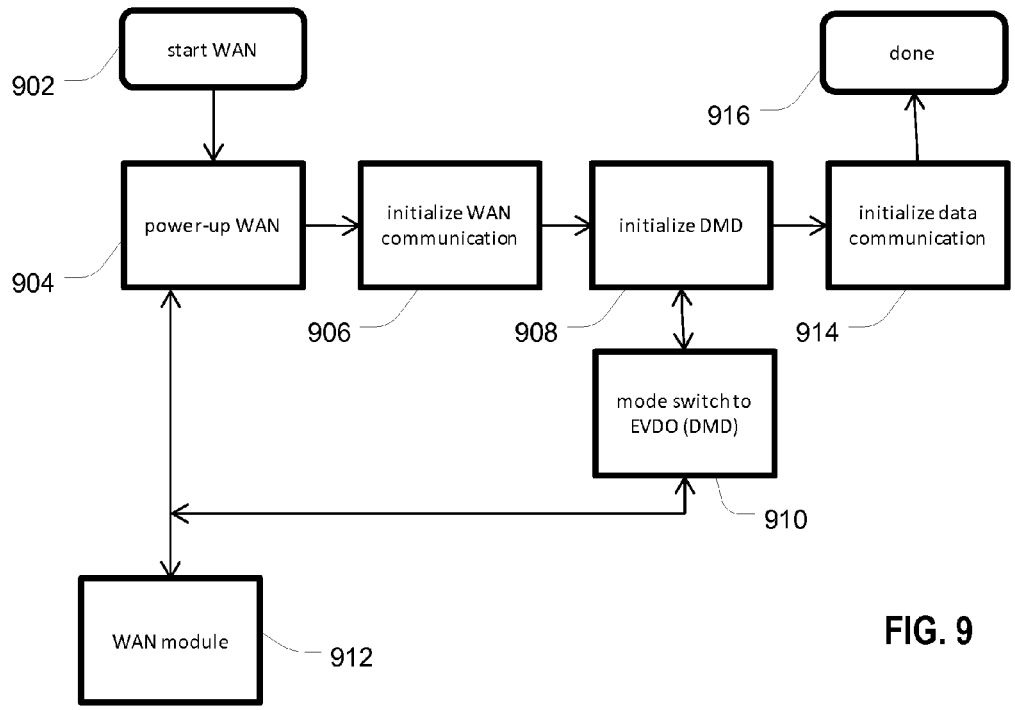
FIG. 9 shows a flow chart of an illustrative embodiment of a method of waking a user device from a sleep mode.

FIG. 9 shows a flow chart of an illustrative embodiment of a method of waking a user device from a sleep mode. The wake process illustrated in FIG. 9 may also be implemented at power up of the user device 104. At 902 a command is received to start the WAN module 912. The WAN module 912 is powered up, at 904, and internal communication with the WAN module 912 is initialized, at 906. At 908, the DMDaemon is initialized. At 908, the DMDaemon invokes the mode switching process 910 to switch the WAN module 912 to an EVDO preferred mode. At 914, external data communications, e.g., communications with the communication enabling service 206, are initialized. The wake process is complete at 916, and the WAN module 912 is ready for use by the user device 104.

Figure 10:
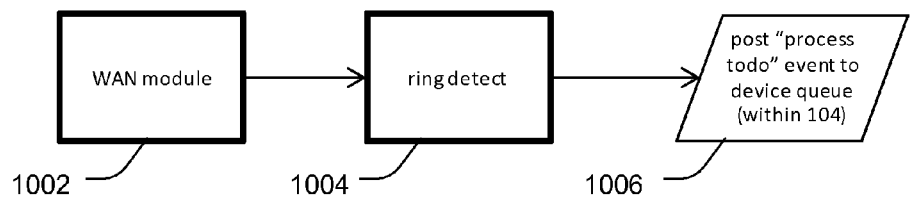
FIG. 10 shows a flow chart of an illustrative embodiment of a method of processing a telephony ring message.

FIG. 10 shows a flow chart of an illustrative embodiment of a method of listening for a telephony ring message, the method generally designated 1000. The method 1000 may run as a background task within the user device 104. At 1002, the out-of-band listener 264 of the WAN module 1002 listens for TPH ring messages. When a TPH ring message is received, a ring detect interrupt is generated, at 1004. The ring detect interrupt is sent by the ring server 260 to the to-do list processing module 334.

Figure 11:
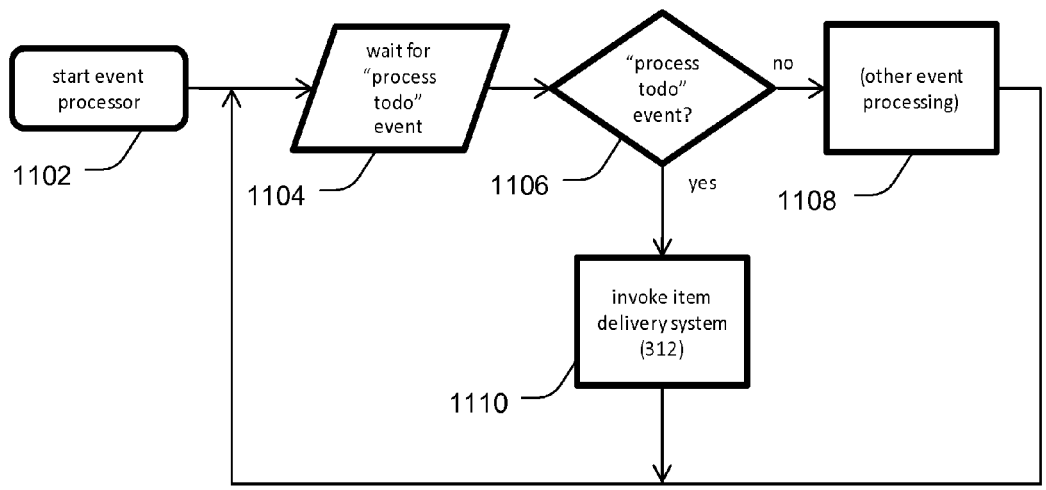
FIG. 11 shows a flow chart of an illustrative embodiment of a method of processing a to-do event.

FIG. 11 shows a flow chart of an illustrative embodiment of a method of processing a to-do list event. The to-do list processing module 334 is powered up, at 1102. The to-do list processing module 334 waits for a to-do event to be posted, at 1104. When an event (e.g., an interrupt) is received, the to-do list processing module 334 determines whether the event is a to-do list process event, at 1106. If the event is not a to-do list process event, at 1108, the to-do list processing module processes the event or passes the event to another module for processing, and returns to waiting for an event, at 1104. If the event is a to-do list process event, at 1110, the to-list processing module 334 contacts the item delivery system 312, as discussed with reference to FIG. 3. For example, the to-do list processing module 334 can download a set of instructions from the IPS 102 related to content to be retrieved from the IPS 102.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A user device, comprising:
   a mode switching wireless communication module, the mode switching wireless communication module adapted to:
   receive, from a computing device, a first paging signal via a first communication protocol while the user device operates in a dormant mode of operation, wherein the first paging signal is received via the first communication protocol based, at least in part, on the user device operating in the dormant mode of operation, and
   receive, from the computing device, a second paging signal via a second communication protocol while the user device operates in an active mode of operation, wherein the second paging signal is received via the second communication protocol based, at least in part, on the user device operating in the active mode of operation; and
   a to-do list processing module, wherein, in response to receiving one of the first or second paging signal, the to-do list processing module sends a request to a remote network device, wherein the request requests that one or more instructions be sent from the remote network device.

2. The user device of claim 1, wherein the user device comprises a portable media reader device.

3. The user device of claim 1, wherein:
   the first communication protocol comprises a telephone ring signal sent via a 1xRTT signal; and
   the second communication protocol comprises a notification signal sent via an Evolution-Data Optimized (EVDO) signal.

4. A method comprising:
   receiving, from a computing device, a first paging signal in a first communication protocol while operating in a first mode of operation, wherein the first paging signal is received in the first communication protocol based, at least in part, on the user device operating in the first mode of operation;
   switching to a second mode of operation;
   establishing a wireless connection to a remote network device using the first communication protocol or a second communication protocol;
   sending a request to access a data list to the remote network device, the data list related to the received first paging signal; and
   subsequent to switching to the second mode of operation, receiving, from the computing device, a second paging signal in the second communication protocol while operating in the second mode of operation, wherein the second paging signal is received in the second communication protocol based, at least in part, on the user device operating in the second mode of operation.

5. An electronic reader device comprising:
   a user interface including a display and including user controls to enable a user to download and read content;
   a wireless data modem including a wireless interface for communication with a server having access to downloadable content, the wireless data modem including logic to selectively communicate with the server via a network using either (i) a first communication protocol during an active mode of operation, or (ii) a second communication protocol during a dormant mode of operation, wherein the first communication protocol comprises a notification signal sent via an Evolution-Data Optimized (EVDO) signal and the second communication protocol comprises a telephone ring signal sent via a 1 xRTT signal;
   a processor coupled to the wireless data modem and to the user interface; and
   a memory coupled to the processor, the memory storing the content.

6. The electronic reader device of claim 5, wherein the first communication protocol supports a faster data communication rate than the second communication protocol.

7. The electronic reader device of claim 5, wherein when a wide area network switch is enabled, the wireless data modem enters the dormant mode of operation.

8. The electronic reader device of claim 7, wherein upon a power up or wake up trigger event, a software program executed by the processor triggers a soft switch that changes the state of the wireless data modem from the dormant mode of operation to the active mode of operation.

9. The electronic reader device of claim 8, wherein the wireless data modem uses Internet Protocol (IP) data packets to communicate during the active mode of operation.

10. The electronic reader device of claim 8, wherein during the active mode of operation, the wireless data modem:
    monitors and receives EVDO-based pages,
    refrains from monitoring or receiving 1xRTT-based pages, and
    is not synchronized to the 1xRTT signal.

11. The electronic reader device of claim 5, wherein during the dormant mode of operation, when the wireless data modem is idle, the wireless data modem periodically stops monitoring and receiving 1xRTT-based pages and performs a mode rescan operation to attempt to establish or reestablish an EVDO connection.

12. The electronic reader device of claim 11, wherein during the mode rescan operation, the wireless data modem loses data synchronization as it abandons the dormant mode of operation in search for the EVDO connection.

* * * * *